(12) United States Patent (10) Patent No.: US 8,154,543 B2
Song et al. (45) Date of Patent: Apr. 10, 2012

(54) STEREOSCOPIC IMAGE DISPLAY DEVICE

(75) Inventors: Myoung-Seop Song, Yongin-si (KR);
Jang-Doo Lee, Yongin-si (KR);
Hyoung-Wook Jang, Yongin-si (KR);
Woo-Jong Lee, Seoul (KR); Hyun-Sook Kim, Yongin-si (KR); Hag-Keun Kim, Gunpo-si (KR); Duck-Myung Lee, Seoul (KR); Han-Jun Choi, Seongnam-si (KR)

(73) Assignees: Samsung Mobile Display Co., Ltd., Yongin (KR); Nexuschips Co., Ltd., Seoul (KR)

( * ) Notice: Subject to any disclaimer, the term of this patent is extended or adjusted under 35 U.S.C. 154(b) by 804 days.

(21) Appl. No.: 11/480,730

(22) Filed: Jul. 3, 2006

(65) Prior Publication Data
US 2007/0008315 A1 Jan. 11, 2007

(30) Foreign Application Priority Data
Jul. 5, 2005 (KR) .................. 10-2005-0060211

(51) Int. Cl.
*G06T 15/00* (2011.01)
*G06T 15/20* (2011.01)
(52) U.S. Cl. ........................ 345/419; 345/427
(58) Field of Classification Search .............. 345/419
See application file for complete search history.

(56) References Cited

U.S. PATENT DOCUMENTS

| 4,601,053 A | 7/1986 | Grumet |
| 4,896,210 A | 1/1990 | Brokenshire et al. |
| 5,255,211 A | 10/1993 | Redmond |
| 5,581,665 A | 12/1996 | Sugiura et al. |
| 5,864,342 A * | 1/1999 | Kajiya et al. .................. 345/418 |
| 5,959,663 A | 9/1999 | Oba et al. |
| 5,982,375 A | 11/1999 | Nelson et al. |
| 6,011,581 A | 1/2000 | Swift et al. |

(Continued)

FOREIGN PATENT DOCUMENTS
CN 1277698 A 12/2000
(Continued)

OTHER PUBLICATIONS

European Search Report dated Oct. 24, 2006 for 06116598.1, in the name of Samsung SDI Co., Ltd.

(Continued)

*Primary Examiner* — Daniel Hajnik
(74) *Attorney, Agent, or Firm* — Christie, Parker & Hale, LLP

(57) ABSTRACT

A stereoscopic image display device includes a display panel including a plurality of left eye pixels and a plurality of right eye pixels, a memory including a left eye image section for storing data corresponding to the left eye pixels and a right eye image section for storing data corresponding to the right eye pixels, a geometric engine for converting an input 3D image data into left eye 3D image data corresponding to the left eye pixels or right eye 3D image data corresponding to the right eye pixels, and a rendering engine for calculating a coordinate value and a color information value to be stored in the left eye section or the right eye section by using coordinate and color information of the left eye 3D image data or the right eye 3D image data, and for storing the color information value in the memory based on the coordinate value.

16 Claims, 5 Drawing Sheets

U.S. PATENT DOCUMENTS

| | | | |
|---|---|---|---|
| 6,014,472 | A | 1/2000 | Minami et al. |
| 6,094,216 | A * | 7/2000 | Taniguchi et al. ............... 348/51 |
| 6,108,005 | A | 8/2000 | Starks et al. |
| 6,172,686 | B1 | 1/2001 | Mizutani |
| 6,175,379 | B1 | 1/2001 | Uomori et al. |
| 6,204,876 | B1 | 3/2001 | Uomori et al. |
| 6,477,267 | B1 | 11/2002 | Richards |
| 6,496,183 | B1 * | 12/2002 | Bar-Nahum ................... 345/419 |
| 6,515,662 | B1 | 2/2003 | Garland |
| 6,593,959 | B1 * | 7/2003 | Kim et al. ........................ 348/57 |
| 6,624,813 | B1 | 9/2003 | Wang |
| 6,631,205 | B1 | 10/2003 | Melen et al. |
| 6,640,004 | B2 * | 10/2003 | Katayama et al. ............ 382/154 |
| 7,058,252 | B2 | 6/2006 | Woodgate et al. |
| 7,371,163 | B1 * | 5/2008 | Best ..................................... 463/1 |
| 7,391,417 | B2 | 6/2008 | Osako |
| 7,545,380 | B1 | 6/2009 | Diard et al. |
| 2001/0020946 | A1 | 9/2001 | Kawakami et al. |
| 2001/0043226 | A1* | 11/2001 | Visser et al. ................... 345/581 |
| 2002/0105484 | A1 | 8/2002 | Navab et al. |
| 2002/0154214 | A1 | 10/2002 | Scallie et al. |
| 2002/0191000 | A1 | 12/2002 | Henn |
| 2002/0196251 | A1 | 12/2002 | Duluk, Jr. et al. |
| 2003/0048354 | A1 | 3/2003 | Takemoto et al. |
| 2003/0160780 | A1 | 8/2003 | Lefebvre et al. |
| 2004/0004616 | A1* | 1/2004 | Konya et al. ................... 345/419 |
| 2004/0027452 | A1 | 2/2004 | Yun et al. |
| 2004/0032980 | A1 | 2/2004 | Harman |
| 2004/0169670 | A1 | 9/2004 | Uehara et al. |
| 2004/0212612 | A1* | 10/2004 | Epstein et al. ................. 345/419 |
| 2004/0239685 | A1 | 12/2004 | Kiyokawa et al. |

FOREIGN PATENT DOCUMENTS

| | | |
|---|---|---|
| EP | 0 583 060 A2 | 2/1994 |
| EP | 0 583 060 A3 | 2/1994 |
| EP | 0 607 000 A2 | 7/1994 |
| EP | 0 751 689 A2 | 1/1997 |
| EP | 0 751 689 A3 | 1/1997 |
| EP | 0 963 122 A2 | 12/1999 |
| EP | 1 406 456 A2 | 4/2004 |
| EP | 1 406 456 A3 | 1/2006 |
| JP | 03-119889 | 5/1991 |
| JP | 04-077882 | 3/1992 |
| JP | 07-322305 | 12/1995 |
| JP | 09-074573 | 3/1997 |
| JP | 10-232953 | 9/1998 |
| JP | 2001-155182 | 6/2001 |
| JP | 2002-024856 | 1/2002 |
| JP | 2002-519792 | 7/2002 |
| JP | 2003-047027 | 2/2003 |
| JP | 2003-070022 | 3/2003 |
| JP | 2003-169351 | 6/2003 |
| JP | 2004-120165 | 4/2004 |
| JP | 2004-165710 | 6/2004 |
| JP | 2004-280078 | 10/2004 |
| JP | 2004-289681 | 10/2004 |
| JP | 2005-011275 | 1/2005 |
| KR | 10-0239132 | 10/1999 |
| KR | 10-2001-0023290 | 3/2001 |
| KR | 10-2003-0088513 | 11/2003 |
| KR | 10-0456952 | 11/2004 |
| KR | 10-2005-0078737 | 8/2005 |
| WO | WO 97/23097 | 6/1997 |
| WO | WO 98/43442 | 10/1998 |
| WO | WO 00/00934 | 1/2000 |
| WO | WO 2004/051307 A2 | 6/2004 |
| WO | WO 2005/013623 A1 | 2/2005 |

OTHER PUBLICATIONS

European Search Report for patent application No. 06116595.7-2002 dated Nov. 2, 2006.

European Search Report dated Nov. 10, 2006, for EP application 06118463.6.

U.S. Office action dated Mar. 10, 2009, for U.S. Appl. No. 11/499,424.

U.S. Office action dated Sep. 25, 2009, for related U.S. Appl. No. 11/499,424, noting U.S. Patent 7,391,417 listed in this IDS.

U.S. Office action dated Dec. 8, 2008, for related U.S. Appl. No. 11/480,646, noting U.S. patents and publications, previously filed in an IDS dated Sep. 10, 2009.

U.S. Office action dated May 22, 2009, for related U.S. Appl. No. 11/480,646, noting U.S. Patent 6,631,205 previously filed in an IDS dated Sep. 10, 2009.

U.S. Office action dated Oct. 4, 2010, for cross-reference U.S. Appl. No. 11/499,424, noting listed references in this IDS.

U.S. Office action dated Feb. 7, 2011, for cross reference U.S. Appl. No. 11/480,646.

U.S. Office action dated Feb. 11, 2011, for cross reference U.S. Appl. No. 11/499,424.

Japanese Office action dated Jun. 28, 2011, for corresponding Japanese Patent application 2006-171871, 2 pages, Paragraph 0048 of cited reference 6 and Fig. 2 disclose a "mobile phone equipped with 3D face display device".

Takushi, I., *3D displayer that is unnecessary glasses, which is developed by a Sanyo*, Nikkei Electronics, Japan, Nikkei Business Publications, Inc., Oct. 24, 1994, vol. 620, pp. 109-112.

Minoru, Y., *3D Television that is unnecessary glasses*, NHK Giken Dayori, Science and Technical Research Laboratories, Japan Broadcasting Corporation, Dec. 1, 1992, vol. 35, pp. 2-5, p. 2 discloses, "3D display without glasses", and Fig. 1 uses a "parallax barrier method".

U.S. Office action dated Jul. 15, 2011, for cross-reference U.S. Appl. No. 11/499,424, 57 pages.

U.S. Office action dated Nov. 7, 2011, for cross-reference U.S. Appl. No. 11/499,424, 44 pages.

* cited by examiner

STEREOSCOPIC IMAGE DISPLAY DEVICE

CROSS-REFERENCE TO RELATED APPLICATION

This application claims priority to and the benefit of Korean Patent Application No. 10-2005-0060211, filed in the Korean Intellectual Property Office on Jul. 05, 2005, the entire content of which is incorporated herein by reference.

BACKGROUND OF THE INVENTION

1. Field of the Invention

The present invention relates to a stereoscopic image display device.

2. Description of the Related Art

A stereoscopic image display device provides a stereoscopic image having a depth effect and a stereoscopic effect, without using additional devices such as polarizing spectacles, because different images are respectively provided to left and right eyes of a user in the stereoscopic image display device.

By providing a parallax barrier, a lenticular lens, or a microlens array on a front of a display panel, the stereoscopic image display device uses a space division method in which left eye and right eye images displayed on the display panel are respectively divided in a left eye direction and a right eye direction.

Three dimensional (3D) data is converted into stereoscopic image data in order to realize image data for the stereoscopic image display device. The conversion from the 3D data to the stereoscopic image data is generally performed outside the stereoscopic image display device.

In addition, the stereoscopic image is usually processed at a speed reduced to about 50 percent of an image processing speed of a conventional 3D image for the same contents. This is because while the conventional 3D image is displayed by generating an image for a single eye at a time, the stereoscopic image is displayed by respectively generating images for the left and right eyes and combining the generated images. Accordingly, the time for processing the stereoscopic image is doubled compared to the conventional 3D image.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention provides a stereoscopic image display device for converting 3D data to stereoscopic image data and for increasing image processing speed.

An exemplary stereoscopic image display device according to an embodiment of the present invention includes a display panel, a memory, a geometric engine, and a rendering engine. The display panel includes a plurality of left eye pixels and a plurality of right eye pixels. The memory includes a left eye image section for storing data corresponding to the plurality of left eye pixels and a right eye image section for storing data corresponding to the plurality of right eye pixels. The geometric engine converts an input 3D image data into left eye 3D image data corresponding to the plurality of left eye pixels or right eye 3D image data corresponding to the plurality of right eye pixels. The rendering engine calculates a coordinate value and a color information value to be stored in the left eye section or the right eye section by using coordinate and color information of the left eye 3D image data or the right eye 3D image data, and stores the color information value in the memory based on the coordinate value.

The coordinate information includes a starting X coordinate and an ending X coordinate of a first line of an area of the left eye 3D image Data or the right eye 3D image data, and the rendering engine calculates an X coordinate value for the first line by increasing the starting X coordinate of the first line by a first increment and calculates a generated color information value for the first line according to the first increment. In one embodiment, the first increment is two.

An exemplary 3D image to stereoscopic image converter for converting input 3D image data into stereoscopic image data includes a geometric engine, an X coordinate increasing unit, a color information increasing unit, and a memory controller. The geometric engine generates left eye 3D image data by multiplying the 3D image data by a first parameter, and generates right eye 3D image data by multiplying the 3D image data by a second parameter. The X coordinate increasing unit generates an X coordinate value corresponding to a first line by increasing a starting X coordinate of the first line corresponding to an area of the left eye 3D image data or the right eye 3D image data by a first increment. The color information increasing unit calculates a second increment according to the first increment, and calculates a generated color information value corresponding to the first line while increasing the starting color information value of the first line by the second increment. The memory controller controls a memory to store the color information value, the color information value having been generated by the color increasing unit based on the X coordinate value generated by the X coordinate increasing unit.

In one embodiment, the first increment is two.

Also, in one embodiment, the second increment is calculated by doubling an increment determined by using a distance between the starting X coordinate and the ending X coordinate of the first line and a difference between the starting color information value and the ending color information value of the first line.

DETAILED DESCRIPTION

Figure 1:
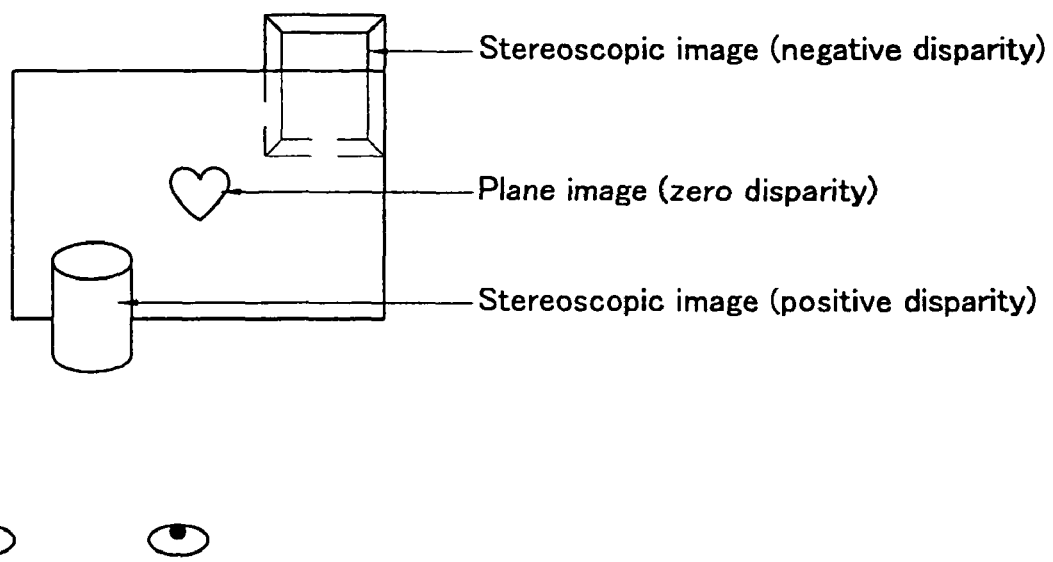
FIG. 1 shows a diagram representing stereoscopic images seen by an observer according to a disparity.

Exemplary embodiments of the present invention will hereinafter be described in more detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Firstly, principles for displaying a stereoscopic image will be schematically described before a stereoscopic image display device according to an exemplary embodiment of the present invention is described.

In general, an observer can perceive different image information on left and right eyes because the left and right eyes can see a stereoscopic object from different positions. Accordingly, the observer obtains depth information for the stereoscopic object and perceives a stereoscopic effect by combining the different image information.

The observer may see the stereoscopic image since the stereoscopic image display device provides respective images to be seen by left and right eyes when the observer sees a stereoscopic object.

Here, a difference between the respective images seen by the left and right eyes is referred to as a disparity. In addition, the observer perceives that the stereoscopic object seems to be closer to the observer than a predetermined reference surface when the disparity has a positive (+) value, and the stereoscopic object seems to be farther from the observer than the predetermined reference surface when the disparity has a negative (−) value.

FIG. 1 shows a diagram for representing stereoscopic images seen by the observer according to the disparity. As shown in FIG. 1, the observer perceives that a cylindrical image having a positive disparity seems to be closer than the reference surface and a rectangular object having a negative disparity seems to be farther than the reference surface.

In addition, the observer perceives that a heart-shaped image having a disparity of a zero (0) value seems to be on the reference surface. When a surface of a display device is established as the reference surface, 'stereoscopic image' can hereinafter refer to an image perceived to be closer to the observer than the reference surface or perceived to be farther from the observer than the reference surface. In addition, 'plane image' can hereinafter refers to an image perceived by the observer to be on the reference surface. In addition, 'stereoscopic image display device' can hereinafter refer to a display device for displaying a stereoscopic image.

In an exemplary embodiment of the present invention, a stereoscopic image display device that can form a stereoscopic effect by separating the left eye and right eye images by using a parallax barrier will be described in more detail. However, the present invention is not limited to a stereoscopic image display device using a parallax barrier method. For example, embodiments of the present invention can also apply to a stereoscopic image display device using a lenticular lens method.

A stereoscopic image display device formed as a liquid crystal display device will be described in more detail with reference to FIG. 2. However, the stereoscopic image display device according to embodiments of the present invention may be applied to an organic light emitting diode (OLED) display device, a plasma display device, and/or an electric field display device.

Figure 2:
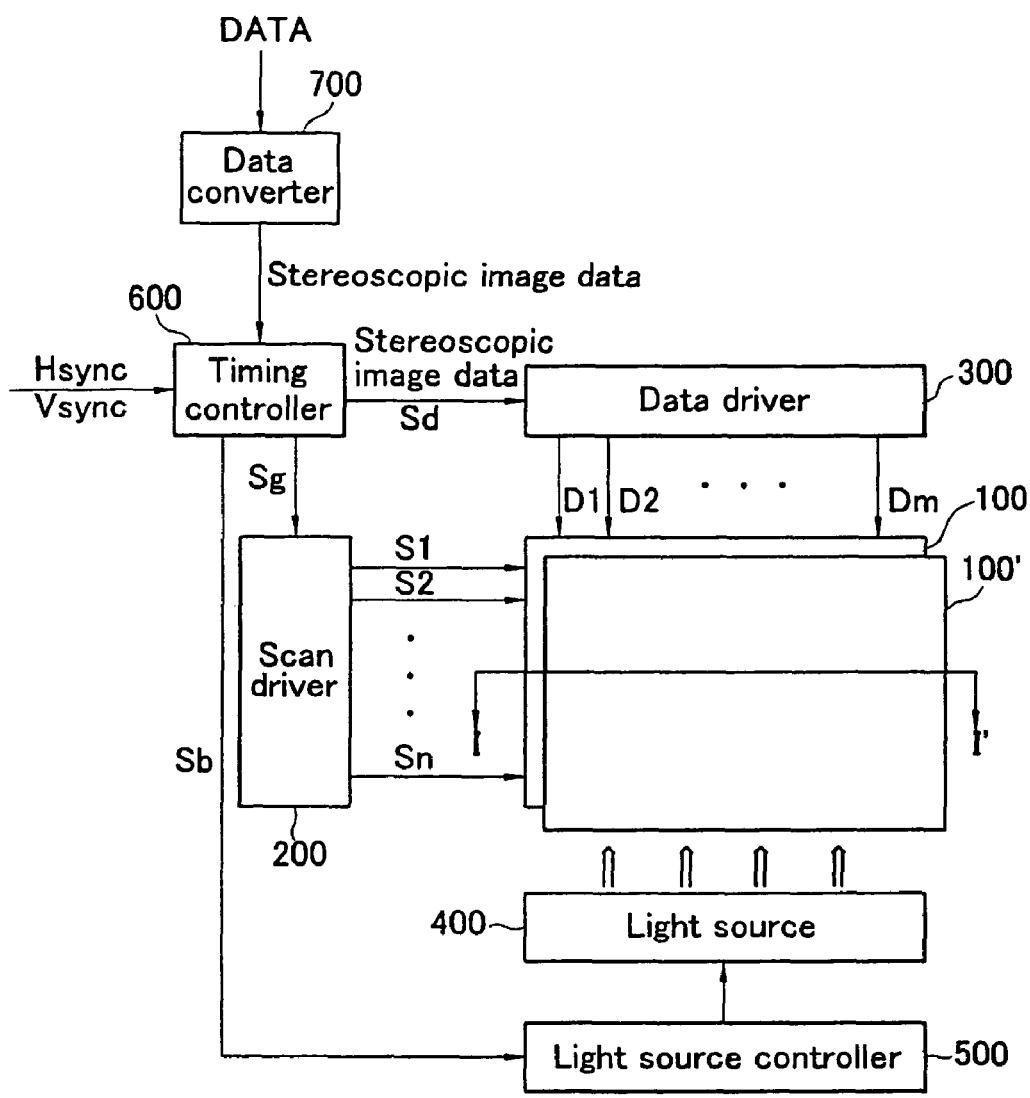
FIG. 2 shows a block diagram of a configuration of a stereoscopic image display device according to an exemplary embodiment of the present invention.

FIG. 2 shows a block diagram for configuring a stereoscopic image display device according to an exemplary embodiment of the present invention.

As shown in FIG. 2, the stereoscopic image display device according to the exemplary embodiment of the present invention includes a display panel 100, a barrier 100', a scan driver 200, a data driver 300, a light source 400, a light source controller 500, a timing controller 600, and a data converter 700. While the light source 400, including a surface light source, can be formed in a rear surface of the display panel 100, the light source 400 is illustrated as being below the display panel 100 in FIG. 2.

The display panel 100 includes a plurality of scan lines S1-Sn for transmitting selection signals, a plurality of data lines D1-Dm insulated from and crossing the plurality of scan lines and for transmitting data signals, and a plurality of subpixels (not shown) formed at areas defined by the crossings of the scan lines S1-Sn and the data lines D1-Dm. In the exemplary embodiment of the present invention, it is assumed that a red subpixel for displaying red (R), a green subpixel for displaying green (G), and a blue subpixel for displaying blue (B) together form a pixel.

In addition, a plurality of pixels of the display panel 100 according to the exemplary embodiment of the present invention include first pixels corresponding to a left eye image (hereinafter, referred to as "left eye pixels"), and second pixels corresponding to a right eye image (hereinafter, referred to as "right eye pixels"). Respective left eye and right eye pixels are alternately arranged. In more detail, the left eye pixels and the right eye pixels are alternately arranged in parallel so that the left eye pixels and the right eye pixels may be formed in a striped or a zigzag pattern. The arrangement of the left eye and right eye pixels may be appropriately varied according to the configuration of the barrier 100'.

The barrier 100' is disposed on a surface of the display panel 100, and includes opaque and transparent regions (not shown) that are arranged corresponding to an arrangement of the left eye pixels and right eye pixels of the display panel 100. The barrier 100' respectively provides the left eye and right eye images respectively projected from the left eye and right eye pixels to left and right eyes of the observer by using the opaque and transparent regions. The opaque and transparent regions of the barrier 100' may be formed in the striped or zigzag pattern according to the arrangement of the left eye and right eye pixels of the display panel 100.

Figure 3:
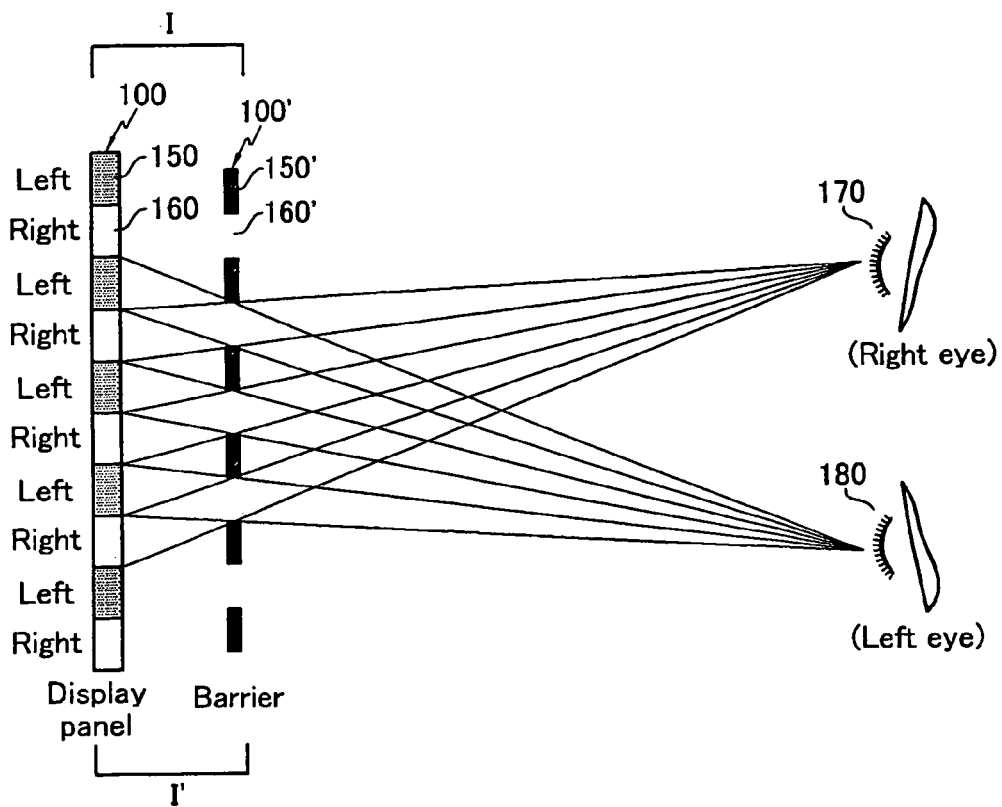
FIG. 3 shows a diagram for representing a stereoscopic image displayed by the stereoscopic image display device shown in FIG. 2.

A method for providing the stereoscopic image to the observer through the display panel 100 and the barrier 100' shown in FIG. 2 will be schematically described with reference to FIG. 3. FIG. 3 shows a sectional view representing a section I to I' of the display panel 100 and the barrier 100'. The observer observes the stereoscopic image through the left eye and right eye pixels on the section I to I'.

As shown in FIG. 3, the display panel 100 includes a plurality of left eye pixels 150 and a plurality of right eye pixels 160 alternately arranged thereon, and the barrier 100' includes opaque regions 150' and transparent regions 160' alternately arranged in parallel with the plurality of left eye pixels 150 and the plurality of right eye pixels 160. The left eye pixels 150 of the display panel 100 project the left eye image to a left eye 180 through the transparent regions 160', and the right eye pixels 160 of the display panel 100 project the right eye image to a right eye 170 through the transparent regions 160' of the barrier 100'. The opaque regions 150' of the barrier 100' form light projection paths so that the left eye pixels 150 and right eye pixels 160 of the display panel 100 may respectively project an image to the left and right eyes through the transparent regions 160'.

The left eye image projected from the left eye pixels 150 is formed as an image having a first disparity in relation to the right eye image, and the right eye image projected from right eye pixels 160 is formed as an image having a second disparity in relation to the left eye image, wherein the first and second disparities may have been predetermined. Therefore, when the left and right eyes of the observer perceive the left eye image projected from the left eye pixels 150 and the right eye image projected from the right eye pixels 160, the observer may perceive the stereoscopic effect because the observer obtains the depth information that is substantially the same as the depth information for an actual stereoscopic object seen by the left and right eyes.

Referring back to FIG. 2, the scan driver 200 respectively applies a selection signal to the scan lines S1-Sn of the display panel 100 after sequentially generating the selection signal in response to a control signal Sg output from the timing controller 600.

The data driver 300 converts an applied stereoscopic image data to an analog data voltage to be applied to the data lines D1-Dm of the display panel 100, and applies the converted analog data voltage to the data lines D1-Dm in response to a control signal Sd input from the timing controller 600.

The light source 400 includes red (R), green (G), and blue (B) light emitting diodes (not shown), and correspondingly outputs respective red (R), green (G), and blue (B) lights to the display panel 100. The red (R), green (G), and blue (B) light emitting diodes of the light source 400 respectively output the lights to the R, G, and B subpixels of the display panel 100.

The light source controller 500 controls a light emitting time of the light emitting diodes of the light source 400 in response to the control signal Sb output from the timing controller 600. Here, a period for providing the data signal from the data driver 300 to the data line and a period for emitting the R, G, and B lights from the light emitting diodes by the light source controller 500 may be synchronized by the control signal provided by the timing controller 600.

The timing controller 600 respectively provides a stereoscopic image signal data input by the data converter 700 and the generated control signals Sg, Sd, and Sb to the scan driver 200, the data driver 300, and the light source controller 500 in response to externally input horizontal synchronization Hsync and vertical synchronization Vsync signals and the stereoscopic image signal data.

The data converter 700 converts input data DATA to stereoscopic image data and transmits the stereoscopic image data to the timing controller 600. In the exemplary embodiment of the present invention, the data DATA input to the data converter 700 is data including 3D image contents (hereinafter referred to as "3D image data"), and the stereoscopic image data includes left eye image and right eye image data respectively corresponding to the left eye and right eye pixels of the display panel 100. In addition, in the exemplary embodiment of the present invention, the 3D image data includes coordinate information (i.e., X and Y coordinate information) and color information of a corresponding coordinate. The color information includes texture coordinate values. The data converter 700 for converting the 3D image data for the plane image may be realized in a graphic accelerating chip.

Figure 4:
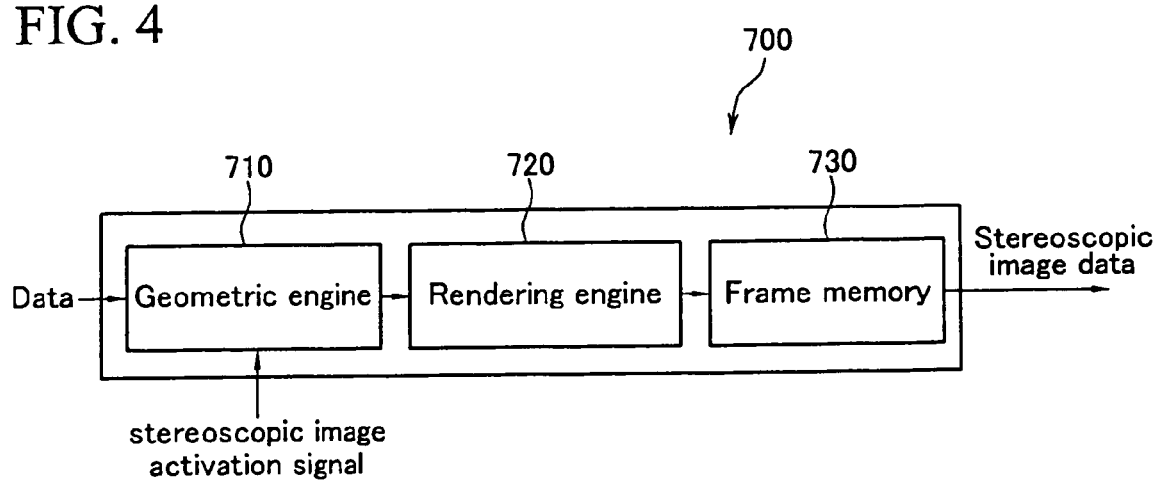
FIG. 4 shows a block diagram of a configuration of a data converter.

Hereinafter, the data converter 700 will be described in more detail with reference to FIG. 4. FIG. 4 shows a block diagram of a configuration of the data converter 700.

As shown in FIG. 4, the data converter 700 according to the exemplary embodiment of the present invention includes a geometric engine 710, a rendering engine 720, and a frame memory 730.

In response to a stereoscopic image activation signal, the geometric engine 710 converts the respective 3D image data into left eye 3D image data or right eye 3D image data by performing an operation on the 3D image data value with a variable corresponding to a position of the left eye or the right eye, and transmits coordinate information and color information corresponding to the left eye 3D image data and the right eye 3D image data to the rendering engine 720. The coordinate information transmitted to the rendering engine 720 includes a starting X coordinate, an ending X coordinate, and a Y coordinate (the Y coordinate is constant for respective lines) corresponding to respective lines (refer to FIG. 6 and FIG. 7) of a predetermined area (e.g., a polygon), and the color information transmitted from the rendering engine 720 includes a starting color information value and an ending color information value corresponding to the respective lines of the predetermined area. The variable corresponding to the position of the left eye or the right eye includes a model view matrix and a projection matrix for the respective left and right eyes. Parameters corresponding to an observing position (i.e., left eye or right eye) of the 3D image are arranged in the model view matrix, and parameters of perspective for the 3D image are arranged in the projection matrix. In more detail, the geometric engine 710 generates the 3D image data for the left and right image data by performing a matrix multiplying operation of the input 3D image data in the model view matrix and the projection matrix for the respective left and right eyes.

When the stereoscopic image activation signal is not applied, the geometric engine 710 converts the input 3D image data into a 3D image for a single eye by performing an operation on the 3D image with a variable corresponding to a single position (i.e., the 3D image for single eye as distinguished from 3D images for the left and right eyes) without differentiating it into the 3D image data for the left eye and the 3D image data for the right eye, and transmits coordinate and color information corresponding to the 3D image data for the single eye to the rendering engine 720. In this case, the 3D image data for the single eye may be generated as plane image data since the 3D image data for the single eye is transmitted through the rendering engine 720 and is overlapped on the left eye image and right eye image sections of the frame memory 730.

The rendering engine 720 receives the coordinate information (i.e., the starting X coordinate, the ending X coordinate, and the Y coordinate) and the color information (i.e., the ending color information value and the starting color information value) included in the 3D image data for the left and right eyes from the geometric engine 710, and stores the color information in the left eye image and right eye image sections of the frame memory 730 based on the coordinate information by using a spanning method. In addition, the rendering engine 720 receives a left/right eye selection signal for indicating whether the 3D data for the left eye is input or the 3D data for the right eye is input from the geometric engine 710. In general, the spanning method is used to store the color information in the frame memory while the X coordinate is increased one by one, and the color information (or texture information) is increased according to the increased X coordinate after calculating starting and ending points of the X coordinate corresponding to a predetermined Y coordinate. The rendering engine 720 according to the exemplary embodiment of the present invention uses the spanning method in which values for coordinates written (stored) in the frame memory are calculated to be written (stored) in the frame memory.

The frame memory 730 is divided into a left eye image section and a right eye image section and the color information is stored in the respective left eye image and right eye image sections by the rendering engine 720, and then the stereoscopic image signal data stored in the frame memory 730 is transmitted to the timing controller 600.

Figure 5:
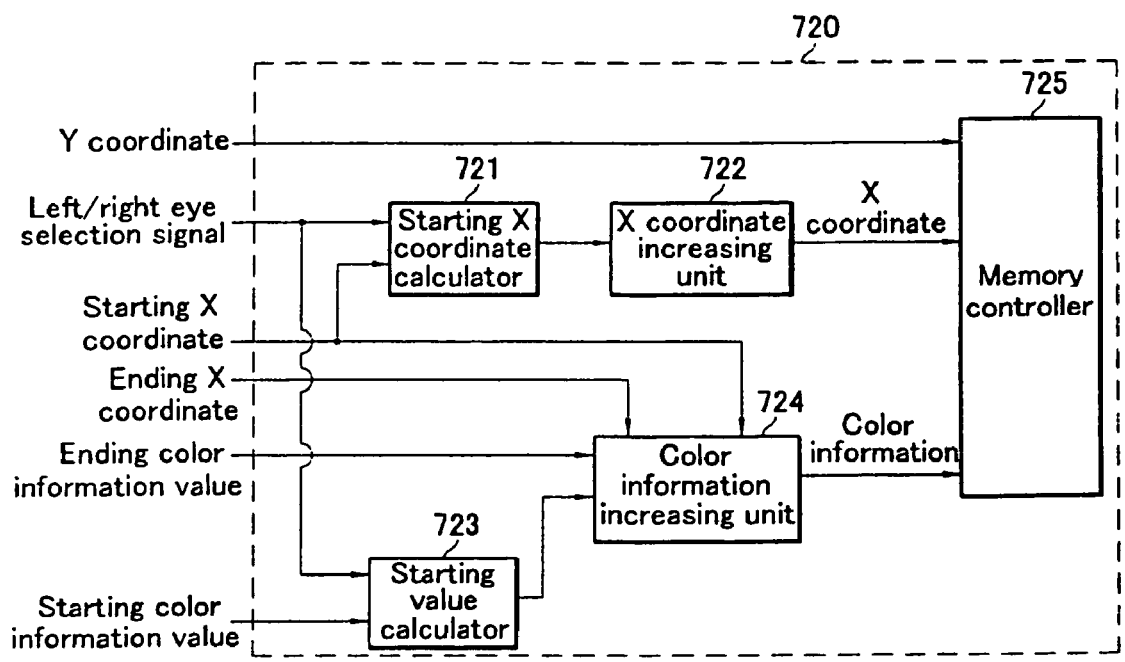
FIG. 5 shows a block diagram of an internal configuration of a rendering engine according to the exemplary embodiment of the present invention.
Figure 6:
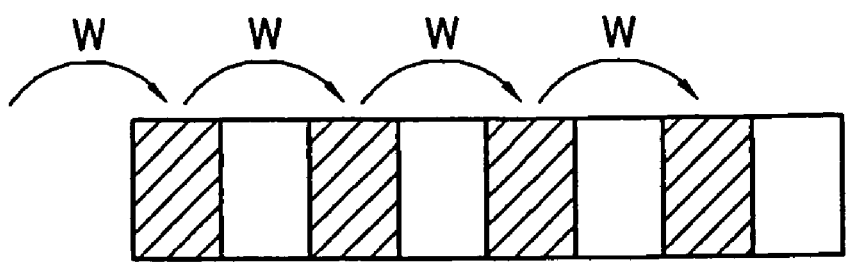
FIG. 6 shows a diagram representing a spanning method applied to the rendering engine according to the exemplary embodiment of the present invention.

Hereinafter, the rendering engine 720 according to the exemplary embodiment of the present invention will be described with reference to FIG. 5 and FIG. 6 in more detail. FIG. 5 shows a block diagram of an internal configuration of the rendering engine 720 according to the exemplary embodiment of the present invention. FIG. 6 shows a diagram representing the spanning method applied to the rendering engine 720 according to the exemplary embodiment of the present invention.

As shown in FIG. 5, the rendering engine 720 according to the exemplary embodiment of the present invention includes a starting X coordinate calculator 721, an X coordinate increasing unit 722, a starting value calculator 723, a color information increasing unit 724, and a memory controller 725.

The starting X coordinate calculator 721 receives the left/right eye selection signal and a starting X coordinate corresponding to a predetermined line (i.e., the predetermined line has a constant Y coordinate), and generates a starting X coordinate corresponding to the left eye selection signal or a starting X coordinate corresponding to the right eye selection signal to transmit the starting X coordinates corresponding to the left eye and right eye selection signals to the X coordinate increasing unit 722.

The X coordinate increasing unit 722 outputs the X coordinate while increasing the starting X coordinate by two with reference to the starting X coordinate transmitted from the starting X coordinate calculator 721. That is, according to the exemplary embodiment of the present invention, the X coordinate is increased by two in order to store the value only for the coordinate to be written in the frame memory 730, and/or to perform a processing calculation only for the coordinate (and/or the color) information to be written in the frame memory 730.

The starting value calculator 723 receives the left/right eye selection signal and the starting color information value (or the texture coordinate starting value) for the predetermined line (i.e., a predetermined Y coordinate), and then generates the starting color information value corresponding to the left eye selection signal or the starting color information value corresponding to the right eye selection signal. Then the starting value calculator 723 transmits the generated starting color information values to the color information increasing unit 724. Hereinafter, the starting color information value and the texture coordinate starting value will be referred to as the starting color information value.

The color information increasing unit 724 receives the starting X coordinate, the ending X coordinate (i.e., the ending X coordinate for the predetermined line), the starting color information value, and the ending color information value (and/or the texture coordinate ending value) for the predetermined line so as to calculate a color information increment, and adds the color information increment to the starting color information value to generate the color information. Hereinafter, the ending color information value and the texture coordinate ending value will be referred to as the ending color information value. In addition, the color information increasing unit 724 calculates a distance between the starting X coordinate and the ending X coordinate by using the received starting X coordinate and the ending X coordinate, calculates a difference between the starting color information value and the ending color information value by using the received starting color information value and the ending color information value, and finally calculates the color information increment (or a texture coordinate increment) by considering the calculated distance, the calculated difference, and the coordinate increased by two in the X coordinate increasing unit 722. That is, since the X coordinate is increased by two in the X coordinate increasing unit 722, the color information increasing unit 724 calculates the color information increment by doubling an increment calculated by using the distance between the starting X coordinate and the ending X coordinate and the difference between the starting color information value and the ending color information value. In addition, the color information increasing unit 724 generates the color information by adding the calculated color information increment to the starting color information value, and outputs the generated color information. A method for calculating the increment by using the distance and the difference is known to those skilled in the art, and therefore, a detailed description thereof will be omitted.

Subsequently, the memory controller 725 receives the predetermined Y coordinate, the X coordinate output from the X coordinate increasing unit 722, and the color information output from the color information increasing unit 724. The memory controller 725 then controls the color information to be stored in the frame memory 730 based on the received Y and X coordinates. Since the received Y coordinate, X coordinate, and color information is to be stored in the frame memory 730, the memory controller 725 sequentially generates a writing activation signal W, so that the color information may be quickly stored in the frame memory 730.

The spanning method applied to the rendering engine 720 according to the exemplary embodiment of the present invention will be described with reference to FIG. 6. It will be assumed that respective oblique lined areas indicate a left eye 3D image data part for one line in a predetermined area (e.g., a polygon) and that the left eye 3D image data is spanned first. Since the left eye 3D image data part is written in the left eye image section, the left eye 3D image data is stored in the frame memory 730 by the writing activation signal W after calculating the coordinate and color information for the left eye 3D image data part as described with reference to FIG. 5. In addition, a right eye 3D image data part is stored in the frame memory 730 in a manner substantially the same as the storage manner of the left eye 3D image data part.

Figure 7:
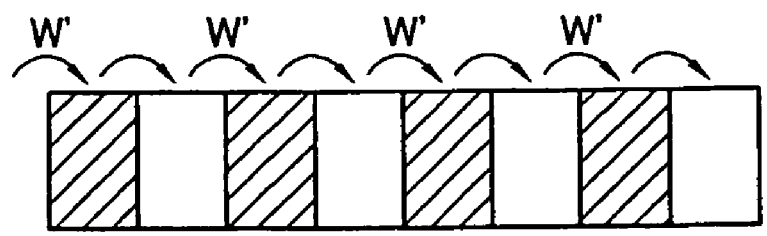
FIG. 7 shows a diagram representing a spanning method in which coordinate and color information for the 3D image data which is not written in the frame memory is calculated not using the spanning method according to the exemplary embodiment of the present invention.

FIG. 7 shows a diagram for representing a spanning method not using the spanning method according to the exemplary embodiment of the present invention and in which coordinate and color information for the 3D image data, which is not written in the frame memory, is also calculated. As shown in FIG. 7, when the spanning method according to the exemplary embodiment of the present invention is not used, the coordinate of the 3D image data which is not written in the frame memory (i.e., left eye image data) is also calculated (e.g., as represented by the curved arrows). That is, a writing activation signal W' for blank areas is not stored in the frame memory 730 because the writing activation signal W' for the blank areas is not generated, but the coordinate and color information is still calculated.

Therefore, since the color information is sequentially stored in the frame memory when the spanning method according to the exemplary embodiment of the present invention as shown in FIG. 6 is used, but the color information is not sequentially stored in the frame memory when the spanning method as shown in FIG. 7 is used, the image processing speed may be doubled when the spanning method according to the exemplary embodiment of the present invention is used as compared with the spanning method of FIG. 7.

The stereoscopic image display device according to the exemplary embodiment of the present invention may be applied not only to a large size display device including flat-screen TVs and monitors but also to a mobile communication terminal and a personal digital assistant (PDA).

In addition, referring back to FIG. 2, the stereoscopic image display device according to another exemplary embodiment of the present invention may include a mode converter (not shown). In this case, the mode converter controls a liquid crystal arrangement of the barrier 100' in response to a mode signal input from the timing controller 600. The mode signal may be set to be generated in response to the stereoscopic image activation signal. In more detail, when the stereoscopic image activation signal is applied, the timing controller 600 generates the mode signal to transmit the mode signal to the mode converter, and the mode converter generates the opaque regions 150' by controlling the liquid crystal arrangement of the barrier 100' in response to the input mode signal. The data converter 700 converts the input 3D image data corresponding to an arrangement of the left eye and right eye pixels so as to transmit the converted image data to the data driver 300, and the data driver 300 displays the stereoscopic image by respectively applying the stereoscopic image data to the corresponding left eye and right eye pixels. On the other hand, when the stereoscopic image activation signal is not applied, the barrier 100' does not generate the opaque regions 150', the data converter 700 converts the input 3D image into a plane image data signal and transmits the plane image data signal to the data driver 300, and the data driver 300 displays a plane image by respectively applying the plane image data to the corresponding pixels.

As described above, the stereoscopic image display device according to the exemplary embodiment of the present invention may display the stereoscopic image by converting 3D image contents for the plane image into the stereoscopic image data in real time when the 3D image contents for the plane image are input. In addition, a speed for processing the image may be increased since the data converter (or graphic accelerating chip) according to the exemplary embodiment of the present invention performs a calculation for only the coordinate and color information written in the frame memory.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A stereoscopic image display device comprising:
a display panel comprising a plurality of left eye pixels and a plurality of right eye pixels, wherein the left eye pixels and the right eye pixels are arranged on the display panel in an alternating manner so that the right eye pixels do not overlap with the left eye pixels;
a memory comprising a left eye image section for storing data corresponding to the plurality of left eye pixels and a right eye image section for storing data corresponding to the plurality of right eye pixels;
a geometric engine for converting input 3D image data into left eye 3D image data corresponding to the plurality of left eye pixels or right eye 3D image data corresponding to the plurality of right eye pixels; and
a rendering engine for calculating left and right coordinate values and left and right color information values to be stored in the left eye image section and the right eye image section by using coordinate information and color information of the left eye 3D image data and the right eye 3D image data, and for storing the left and right color information values in the memory based on the left and right coordinate values, respectively, wherein the left coordinate value and the left color information value corresponding to only the left eye pixels are calculated by the rendering engine when the left color information value is stored in the left eye image section of the memory, and the right coordinate value and the right color information value corresponding to only the right eye pixels are calculated by the rendering engine when the right color information value is stored in the right eye image section of the memory,
wherein the coordinate information comprises a starting X coordinate and an ending X coordinate of a first line of an area of the left eye 3D image data or the right eye 3D image data,
wherein the rendering engine calculates an X coordinate value for the first line by increasing the starting X coordinate of the first line by a first increment, and calculates a generated color information value for the first line according to the first increment,
wherein the generated color information value comprises a starting color information value and an ending color information value of the first line,
wherein the generated color information value for the first line is calculated by increasing the starting color information value for the first line by a second increment, and
wherein the second increment is calculated according to the first increment by doubling an increment determined by using a distance between the starting X coordinate and the ending X coordinate of the first line and a difference between the starting color information value and the ending color information value of the first line.

2. The stereoscopic image display device of claim 1, wherein the second increment is a calculated color information increment added to the starting color information to generate the generated color information.

3. The stereoscopic image display device of claim 1, wherein the first increment is two.

4. The stereoscopic image display device of claim 1, wherein the first increment comprises a number greater than one to reduce a calculation of the rendering engine.

5. The stereoscopic image display device of claim 1, further comprising a barrier comprising transparent and opaque regions arranged to form a light projection path, wherein the barrier allows images output by the left eye and right eye pixels to respectively be projected in a left direction and a right direction with respect to a viewer through the light projection path.

6. The stereoscopic image display device of claim 1, wherein the stereoscopic image display device corresponds to a display unit of a mobile communication terminal.

7. A 3D image to stereoscopic image converter for converting input 3D image data into stereoscopic image data, the 3D image to stereoscopic image converter comprising:
a geometric engine for generating left eye 3D image data by multiplying the input 3D image data by a first parameter, and for generating right eye 3D image data by multiplying the input 3D image data by a second parameter;

an X coordinate increasing unit for generating an X coordinate value corresponding to a first line by increasing a starting X coordinate of the first line by a first increment, the first line corresponding to an area of the left eye 3D image data or the right eye 3D image data;

a color information increasing unit for calculating a second increment according to the first increment, and for calculating a generated left or right color information value corresponding to the first line while increasing a starting color information value of the first line by the second increment; and a memory controller for controlling a memory to store the generated left or right color information value, the generated left or right color information value having been generated by the color increasing unit based on the X coordinate value generated by the X coordinate increasing unit, wherein the generated left color information value corresponding to only left eye pixels is calculated when the generated left color information value is stored in the memory, and the right color information value corresponding to only right eye pixels is calculated when the right color information value is stored in the memory;

wherein the left eye pixels and the right eye pixels are arranged on a display panel in an alternating manner so that the right eye pixels do not overlap with the left eye pixels, and wherein the second increment is calculated by doubling an increment determined by using a distance between the starting X coordinate and an ending X coordinate of the first line and a difference between the starting color information value and an ending color information value of the first line.

8. The 3D image to stereoscopic image converter of claim 7, wherein the first increment is two.

9. The 3D image to stereoscopic image converter of claim 7, wherein the first increment is increased by two to reduce a processing calculation of the 3D image to stereoscopic image converter.

10. The 3D image to stereoscopic image converter of claim 7, wherein the second increment is a calculated color information increment added to the starting color information to generate the generated color information.

11. The 3D image to stereoscopic image converter of claim 7, wherein the area corresponds to a polygon.

12. The 3D image to stereoscopic image converter of claim 7, wherein the first and second parameters comprise a parameter corresponding to a 3D image observing point and a parameter corresponding to a perspective effect for the 3D image.

13. An image converter for converting input 3D image data into stereoscopic image data, the image converter comprising:

a geometric engine for generating left eye 3D image data by multiplying the input 3D image data by a first parameter, and for generating right eye 3D image data by multiplying the input 3D image data by a second parameter;

a coordinate increasing unit for generating a coordinate value of a first axis corresponding to a first line by increasing a starting coordinate of the first line by a first increment, the first line corresponding to an area of the left eye 3D image data or the right eye 3D image data;

a color information increasing unit for calculating a second increment according to the first increment, and for calculating a left or right generated color information value corresponding to the first line while increasing a starting color information value of the first line by the second increment; and a memory controller for controlling a frame memory to store the generated left or right color information value, the generated left or right color information value having been generated by the color increasing unit based on the coordinate value of the first axis generated by the coordinate increasing unit, wherein the generated left color information value corresponding to only left eye pixels is calculated when the generated left color information value is stored in the frame memory, and the right color information value corresponding to only right eye pixels is calculated when the right color information value is stored in the frame memory;

wherein the left eye pixels and the right eye pixels are arranged on a display panel in an alternating manner so that the right eye pixels do not overlap with the left eye pixels, and wherein the second increment is calculated by doubling an increment determined by using a distance between the starting coordinate and an ending coordinate of the first line and a difference between the starting color information value and an ending color information value of the first line.

14. The image converter of claim 13, wherein the first increment is a number greater than one to reduce a processing calculation of the image converter.

15. The stereoscopic image display device of claim 1, wherein in calculating the left coordinate value and left color information value to be stored in the left eye image section, the rendering engine is configured to skip without calculating a coordinate value or a color value for a first coordinate arranged in-between two coordinates corresponding to two left eye pixels, and wherein in calculating the right coordinate value and right color information value to be stored in the right eye image section, the rendering engine is configured to skip without calculating a coordinate value or a color value for a second coordinate arranged in-between two coordinates corresponding to two right eye pixels.

16. The stereoscopic image display device of claim 1, wherein a left eye image is projected from only the left eye pixels and a right eye image is projected from only the right eye pixels.

* * * * *